US012576927B1

(12) United States Patent
Buchert

(10) Patent No.: US 12,576,927 B1
(45) Date of Patent: Mar. 17, 2026

(54) FIFTH WHEEL CONNECTOR

(71) Applicant: Lane Buchert, Eagle, ID (US)

(72) Inventor: Lane Buchert, Eagle, ID (US)

( * ) Notice: Subject to any disclaimer, the term of this patent is extended or adjusted under 35 U.S.C. 154(b) by 0 days.

(21) Appl. No.: 19/081,244

(22) Filed: Mar. 17, 2025

(51) Int. Cl.
*B62D 53/08* (2006.01)

(52) U.S. Cl.
CPC ..... *B62D 53/0842* (2013.01); *B62D 53/0871* (2013.01)

(58) Field of Classification Search
CPC ............ B62D 53/0842; B62D 53/0871; B62D 53/0857; B62D 53/0821
See application file for complete search history.

(56) References Cited

U.S. PATENT DOCUMENTS

| | | | | |
|---|---|---|---|---|
| 4,268,051 A * | 5/1981 | Skirvin | ..................... | B60P 3/41 |
| | | | | 280/145 |
| 4,555,214 A * | 11/1985 | Morton | ................... | B60P 3/125 |
| | | | | 280/402 |
| 4,832,358 A * | 5/1989 | Bull | ..................... | B62D 53/061 |
| | | | | 280/491.5 |
| 5,110,149 A * | 5/1992 | Dahlstrom | ................ | B60P 3/41 |
| | | | | 280/401 |
| 5,163,698 A * | 11/1992 | Evens | .................. | B62D 53/067 |
| | | | | 280/401 |
| 5,494,309 A * | 2/1996 | Roy | ..................... | B62D 53/067 |
| | | | | 280/401 |
| 5,904,364 A * | 5/1999 | Wylezinski | .......... | B62D 53/067 |
| | | | | 280/425.2 |

| | | | | |
|---|---|---|---|---|
| 6,050,578 A * | 4/2000 | Beck | .................... | B62D 53/067 |
| | | | | 280/404 |
| 6,120,051 A * | 9/2000 | Lichter | ................... | B60P 3/125 |
| | | | | 280/433 |
| 6,491,490 B1 * | 12/2002 | Trobee | ............... | B62D 53/0828 |
| | | | | 280/402 |
| 9,051,007 B2 * | 6/2015 | Orgeron | ................. | B62D 13/00 |
| 9,988,113 B2 * | 6/2018 | Habernegg | .......... | B62D 63/061 |
| 10,759,325 B1 * | 9/2020 | Polny | ..................... | B60P 3/125 |
| 11,332,207 B2 * | 5/2022 | Strelic | .................... | B62D 61/12 |
| 11,459,032 B2 * | 10/2022 | Dehne | ........................ | B60P 3/40 |
| 2001/0054524 A1 * | 12/2001 | Masters | ............... | B62D 13/025 |
| | | | | 280/426 |
| 2013/0049329 A1 * | 2/2013 | Meenen | ............. | B62D 53/0842 |
| | | | | 280/490.1 |
| 2014/0015223 A1 * | 1/2014 | Banwart | ............ | B62D 53/0821 |
| | | | | 280/476.1 |
| 2021/0061376 A1 * | 3/2021 | Moore | ................. | B62D 53/125 |
| 2022/0242497 A1 * | 8/2022 | West | ..................... | B60D 1/145 |

FOREIGN PATENT DOCUMENTS

| | | | | |
|---|---|---|---|---|
| AU | 2020033990 | * | 4/2019 | ................ B60P 1/30 |

* cited by examiner

*Primary Examiner* — Valentin Neacsu
*Assistant Examiner* — Marlon A Arce
(74) *Attorney, Agent, or Firm* — Dorsey & Whitney LLP

(57) ABSTRACT

An embodiment of a connector for a fifth wheel system of a tractor-trailer includes a stinger, a kingpin, a material support, and a trailer hitch. The stinger has a length extending from a first end to a second end. The kingpin is positioned at the first end of the stinger. The trailer hitch is positioned at the second end of the stinger. The material support is position above the kingpin and is rotatable with respect to the kingpin about a vertical axis of rotation. An embodiment of a trailer may be connected to both the kingpin and the trailer hitch, and material is loaded upon the material support.

21 Claims, 6 Drawing Sheets

FIFTH WHEEL CONNECTOR

TECHNICAL FIELD

The present disclosure relates generally to the field of fifth wheel systems for use with a tractor-trailer system. More particularly, some embodiments relate to a connector that permits a fifth wheel system to be used to tow a trailer lacking a kingpin. Some embodiments relate to trailers that connect to a tractor using both a kingpin and a trailer hitch.

BACKGROUND

Tractor-trailers are used to haul large loads of varying materials. In order to do so, a fifth wheel assembly is generally mounted upon the frame of the tractor. FIG. 8 illustrates a known tractor 10 having a fifth wheel plate 20 of a fifth wheel assembly mounted upon the frame 11 of the tractor 10. The frame 11 generally includes a left frame rail 11a, a right frame rail 11b, and one or more cross members 12 connecting the left frame rail 11a to the right frame rail 11b. A rear bumper 16 is mounted at the end of the frame rails 11a, 11b and may be a cross member. The fifth wheel plate 20 has a general "U" shape to receive a kingpin that is mounted upon the trailer to be towed. During use, a portion of the trailer extends over the frame 11 of the tractor 10 and rests upon the top surface 21 of the fifth wheel plate 20. While turning, the trailer rotates about the kingpin as it rotates within the fifth wheel plate 20. The fifth wheel plate 20 is mounted forward of the rear bumper 16 of the frame 11 of the tractor 10, unlike a traditional Class V receiver hitch which is used to couple a trailer behind the rear bumper 16 of the frame 11 of the tractor 10. These are informally referred to as "bumper pull" trailers.

A variety of bumper pull and fifth-wheel trailer types are known in the aggregate industry for transporting material. For example, belly dump, also known as bottom dump trailers, discharge material out the bottom of the trailer while moving; end dump trailers utilize hydraulic cylinders to elevate an end of the hopper and allow materials to slide through the tilted hopper and discharge from a rear of the trailer; side dump trailer discharges materials off the side of the hopper, rather than behind or underneath it; and ejector trailers use a moving plow to eject material out the rear of the hopper. A belly dump trailer may be less prone to tipping because it is not a high clearance trailer with the entirety of the load positioned above the axles of the trailer.

When selecting a trailer, an operator may be forced to select between payload capacity and maneuverability. In particular, the weight capacity of a trailer may be limited by the per axle load limit and length of trailer. Accordingly, longer trailers may be used to maximize loads. However, an increase in load length can also reduce maneuverability. Off-tracking occurs when the tractor makes a turn and the wheels of the trailer cut inside the path of the tractor. For fifth wheels, the extent of off-tracking can increase with a larger distance between the kingpin and wheels of the trailer and/or when a tractor is attempting to navigate a tighter radius turn. Consequently, depending on the terrain to be navigated, operators may be forced to utilize a shorter trailer having a smaller payload in order to maintain maneuverability.

The logging industry generally requires hauling long loads on roads having tight turns. Accordingly, special purpose trucks and trailers have been developed for this application. An example of a patent related to such a truck and trailer is shown in U.S. Pat. No. 5,163,698 to Evens, which is incorporated herein by reference. FIG. 7 shows an example of a known logging trailer. As shown in FIG. 7, a tractor 10 is configured to haul logs 5 supported upon a front bunk 22 and a rear log bunk 25. Front bunk 22 is mounted on the frame 11 of the tractor 10 and rear log bunk 25 is mounted on a trailer 31. Each of front log bunk 22 and rear log bunk 25 is pivotable about respective vertical axes. The frame 11 of the tractor 10 is modified by welding a stinger 30 to the frame 11 such that it extends rearward from the tractor 10. The stinger 30 is coupled to the trailer 31 via a coupler 35. The trailer 31 includes a slidable tongue that permits the length of the trailer 31 to lengthen and shorten as the tractor 10 navigates corners while transporting the logs 5.

The connection of a stinger 30 to the frame 11 of the tractor 10 is useful when hauling logs, but may be undesirable when hauling loads other than logs. In particular, due to the stinger 30 extending rearward from the tractor 10, a traditional 5th wheel trailer cannot be coupled to the tractor 10 without contacting the stinger 30. As a result, many operators resort to cutting the stinger 30 off of the frame 11 when they are not hauling logs and rewelding the stinger 30 to the frame 11 when they are preparing to haul logs again. Alternatively, some stingers 30 are semi-permanently mounted to the frame 11 with bolts, which is still time consuming to install and remove as desired. An additional disadvantage is that a logging trailer 31 cannot be moved by another tractor that is not fitted with the welded stinger 30 needed to couple to the logging trailer 31. As a result, if a tractor were to break down, another tractor that typically hauls fifth wheel trailers may be unable to accept the log load of the first tractor. Other disadvantages may exist.

Other disadvantages of known trailers may exist. The present disclosure includes embodiments that may mitigate some of these disadvantages.

SUMMARY

An embodiment of a tractor-trailer includes a tractor, a trailer, and a connector. The tractor includes a fifth wheel plate, a frame, and a rear bumper. The connector includes a stinger having a length extending from a first end to a second end. The connector includes a kingpin at the first end, a trailer hitch at the second end, a first pivot positioned above the kingpin, and a first material support connected to the first pivot. The kingpin is configured to be received within the fifth wheel plate. The first pivot is rotatable about a first vertical axis of rotation. The length of the stinger causes the trailer hitch to be positioned beyond the rear bumper of the tractor when the kingpin is received within the fifth wheel plate. The trailer includes a chassis supported upon a trailer axle, a coupler configured to be received by a trailer hitch, a second pivot supported upon the chassis, and a second material support connected to the second pivot. The second pivot is rotatable about a second vertical axis of rotation.

The tongue of the trailer may be extendable and not fixed in length when the coupler of the trailer is received by the trailer hitch to compensate for a change in the distance between the trailer hitch and the second pivot when the tractor is turning.

The connector may include a distribution plate positioned above the kingpin. The pivot is positioned above the distribution plate. The distribution plate extends across a top surface of the fifth wheel plate. The length of the stinger may be at least five feet, and in some embodiments the length of the stinger may be at least ten feet. The trailer hitch may be a pintle hook.

The first material support may be a first log bunk and the second material support may be a second log bunk.

The trailer may include a load platform extending from the first material support to the second material support. The trailer may be an aggregate trailer with the load platform forming a hopper having a first end and a second end. The hopper is connected to the first material support and connected to the second material support. The hopper may include a gate at the second end of the hopper. The hopper may include an ejector system configured to move material within the hopper from the first end of the hopper to the second end of the hopper.

The tractor-trailer may include a set of stabilizers connected to the stinger. The set of stabilizers is configured to prevent lateral movement of the stinger with respect to the frame of the tractor. Each stabilizer of the set of stabilizers may have a guard. The guards of the set of stabilizers may be positioned on opposing exterior sides of the frame of the tractor. The guards of the set of stabilizers may be positioned on opposing interior sides of the frame of the tractor. Each stabilizer may include an extension extending laterally from the stinger and the guard extends downward from the extension. The guards may extend below a bottom surface of the stinger. The tractor-trailer may include two sets of stabilizers. The guards of the first set of stabilizers may be positioned on opposing exterior sides of the frame of the tractor and the guards of the second set of stabilizers may be positioned on opposing interior sides of the frame of the tractor.

At least one stabilizer of the set of stabilizers may include a lock selectively extendable from the guard. The lock may extend laterally from the guard in a direction towards a longitudinal axis of the stinger. The lock may extend laterally from the guard in a direction away from a longitudinal axis of the stinger. The lock may extend into the frame of the tractor. The lock may extend laterally underneath the frame of the tractor. The lock may be electronically actuatable.

The tractor-trailer may include a control module and a fluid supply. The lock may be actuatable by the fluid supply and the control module is configured to selectively control flow from the fluid supply to actuate the lock.

An embodiment of a tractor-trailer includes a tractor, a first pivot, a trailer, a hopper, and an ejector system.

The tractor has a fifth wheel plate, a frame, a rear bumper, a stinger having a length extending from a first end to a second end, and a trailer hitch at the second end of the stinger. The stinger is rigidly supported upon the frame of the tractor at the first end. The length of the stinger causes the stinger to extend behind the rear bumper of the tractor. The first pivot is positioned above the frame of the tractor. The first pivot is rotatable about a first vertical axis of rotation. The trailer has a chassis supported upon a trailer axle, a coupler configured to be received by the trailer hitch, and a second pivot. The second pivot is rotatable about a second vertical axis of rotation. The stinger may include a kingpin at the first end of the stinger.

The hopper has a first end, a second end, and a gate at the second end of the hopper. The hopper is rigidly connected to the first pivot and rigidly connected to the second pivot. The ejector system is configured to move material within the hopper from the first end of the hopper to the second end of the hopper.

An embodiment of a connector for a fifth wheel system of a tractor-trailer includes a stinger, a kingpin, a material support, and trailer hitch. The stinger has a length extending from a first end to a second end. The kingpin is positioned at the first end of the stinger. The trailer hitch is positioned at the second end of the stinger. The material support is position above the kingpin and is rotatable with respect to the kingpin about a vertical axis of rotation.

The trailer hitch may be a pintle hook. The length of the stinger may be at least five feet. The material support may be a first log bunk. The material support may be connected to a front portion of a hopper having a first end, a second end, the front portion, a rear portion, and a gate at the second end of the hopper.

The connector may include a set of stabilizers connected to the stinger, each stabilizer of the set of stabilizers having a guard shaped to interface with a frame of a tractor. A distance between the guards of the set of stabilizers may be an exterior frame width of a tractor. A distance between the guards of the set of stabilizers may be an interior frame width of a tractor. At least one stabilizer of the set of stabilizers may include a lock selectively extendable from the guard.

The connector may include a control module and a fluid supply. The lock may be actuatable by the fluid supply and the control module is configured to selectively control flow from the fluid supply to actuate the lock.

An embodiment of a fifth wheel trailer includes a load platform, a trailer chassis, and a kingpin. The load platform includes a first end, a second end, a front portion, and a rear portion. The trailer chassis has a tongue and a coupler configured to be received by a trailer hitch. The trailer chassis is supported upon a trailer axle. The rear portion of the load platform is rotatably supported upon the trailer chassis. The kingpin is positioned beneath the front portion of the load platform. The load platform may be a hopper. The hoper may include a gate at the second end of the hopper.

The fifth wheel trailer may include an ejector system configured to move material within the hopper from the first end of the hopper to the second end of the hopper. The fifth wheel trailer may include a stinger having a length extending from a first end to a second end. The kingpin may be at the first end of the stinger and the trailer hitch may be at the second end of the stinger. The front portion of the hopper may be rotatably supported above the kingpin.

An embodiment of a method of coupling a trailer to a tractor having a fifth wheel plate includes positioning a kingpin at a first end of a connector into the fifth wheel plate of a tractor and coupling a trailer to a trailer hitch at a second end of the connector. The trailer hitch is positioned behind the bumper of the tractor.

The method may include positioning the guards of a set of stabilizers adjacent to the lateral sides of the frame of the tractor to prevent lateral movement of the connector. The method may include extending at least one lock from at least one guard into the frame of the tractor. The method may include extending at least one lock from at least one guard under the frame of the tractor. The method may include ejecting material from a hopper of the trailer while the trailer is coupled to both the kingpin and the trailer hitch.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

Phrases relating to direction, such as above, below, rear, and forward refer to the orientation in relation to the normal direction of a travel of a tractor-trailer and gravity during use (e.g. a trailer is coupled rearward of the tractor with the trailer being situated above the road).

The phrase "rigidly connected" means that two components are connected in such a manner that they move together as a single component. The term "connected" alone is broad enough to refer to any suitable coupling or other form of interaction between two or more entities, including mechanical interaction. Thus, two components may be connected to each other even though they are not in direct contact with each other.

Figure 1:
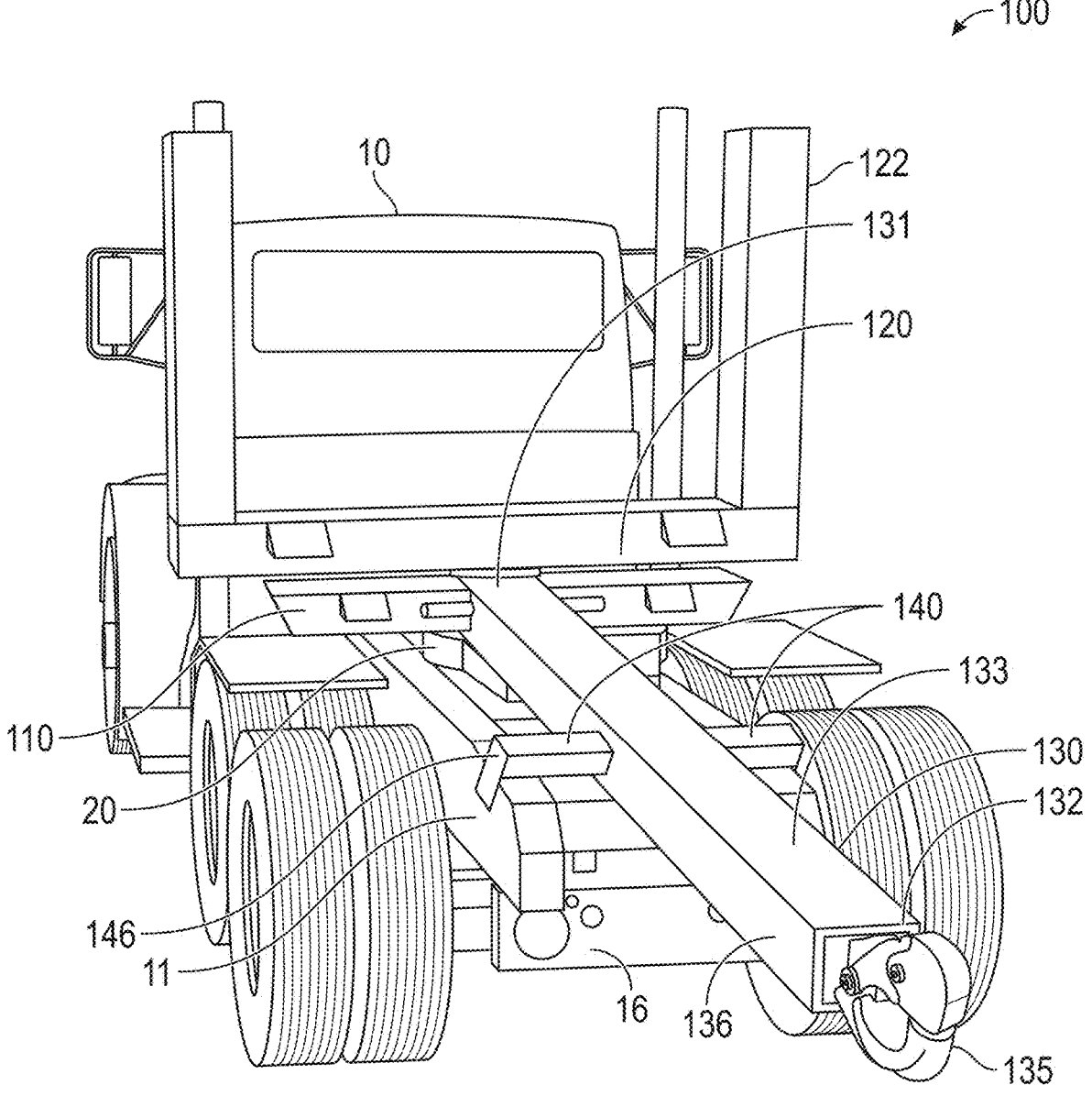
FIG. 1 illustrates a perspective view of tractor with a fifth wheel connection according to one embodiment of the present disclosure.
Figure 2:
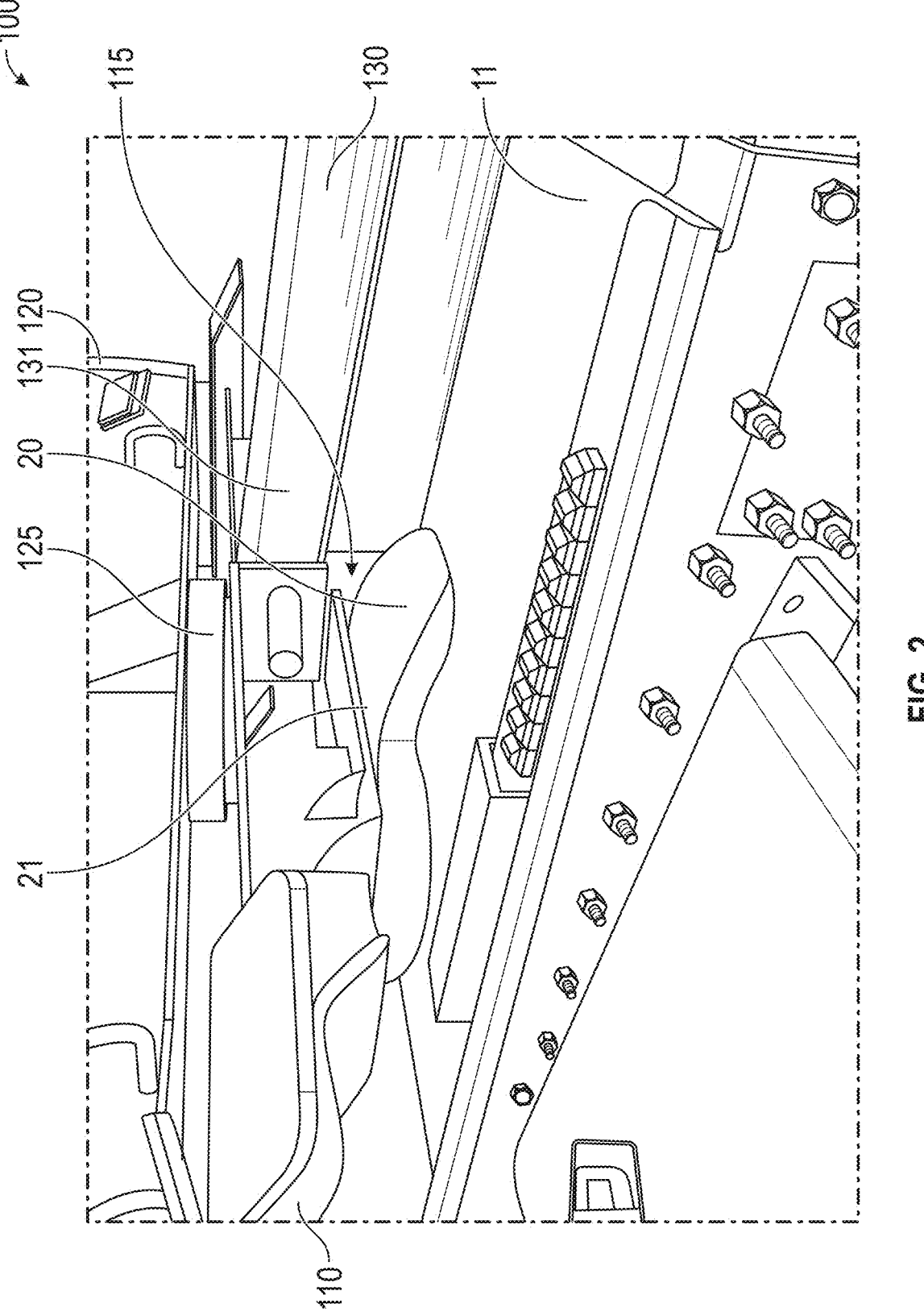
FIG. 2 illustrates a perspective view of the fifth wheel connection according to the embodiment shown in FIG. 1.
Figures 3, 4:
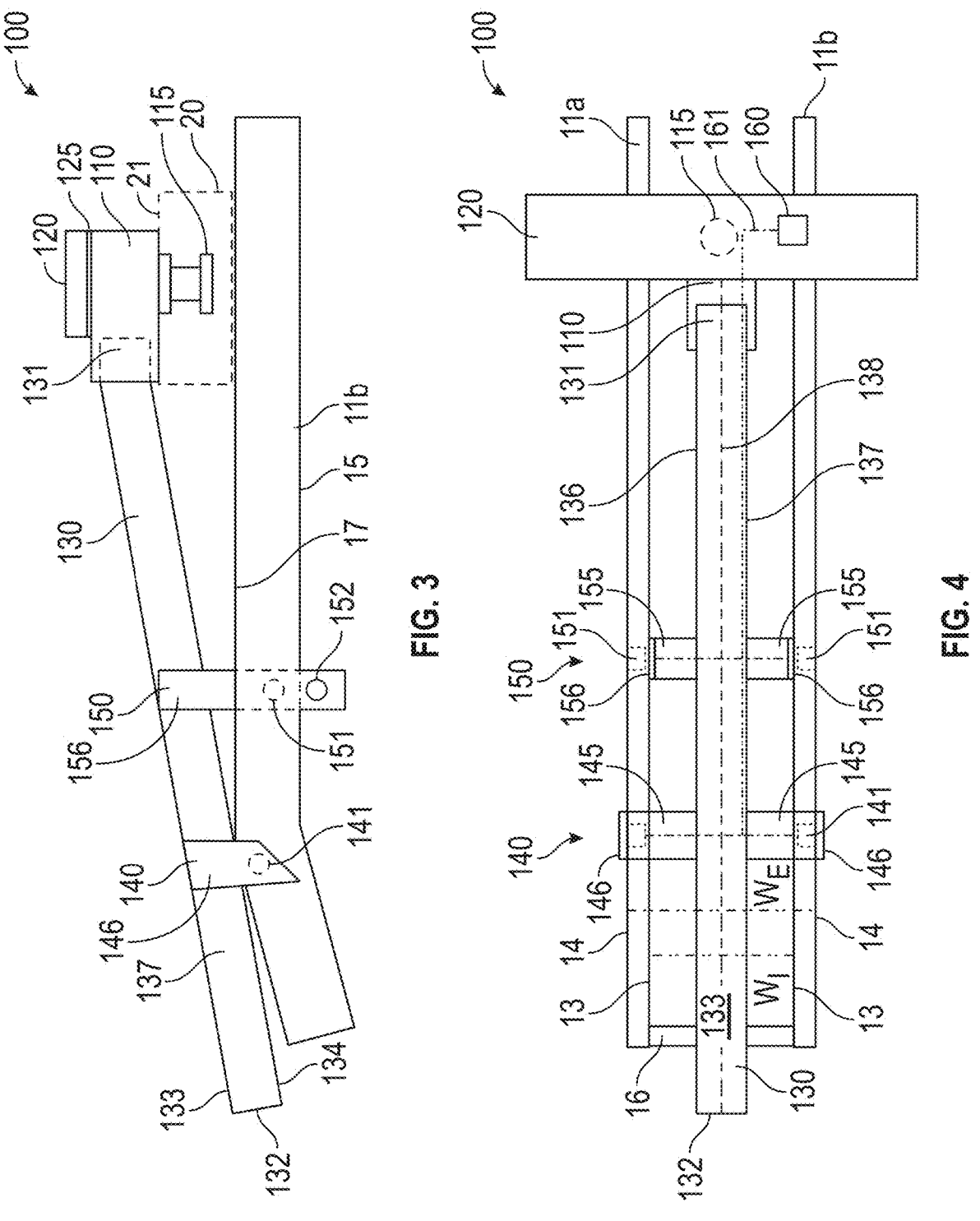
FIG. 3 illustrates a partial, side view of a fifth wheel connection according to one embodiment of the present disclosure.
FIG. 4 illustrates a partial, plan cross-sectional view of a fifth wheel connection according to one embodiment of the present disclosure.

The present disclosure is directed to a fifth wheel system with a connector configured to permit a bumper pull trailer to be coupled to a fifth wheel plate of a tractor. FIGS. 1 and 2 illustrate perspective views of a fifth wheel system with a connector 100 for use with a tractor 10. The tractor 10 includes a vehicle frame 11 with a rear bumper 16. A fifth wheel plate 20 is mounted upon the frame 11 of the tractor 10. The connector 100 includes a kingpin 115 (shown in FIGS. 2 and 3), a stinger 130, and a trailer hitch 135. The stinger 130 extends along a length from a first end 131 to a second end 132. In some embodiments, the stinger 130 may be formed of a straight beam along its length. In some embodiments, the stinger 130 may include a curved or stepped shape along its length. The kingpin 115 is located at a first end 131 of the stinger 130, as shown in FIG. 3. The kingpin 115 is shaped to be received within the fifth wheel plate 20 of the tractor 10. The trailer hitch 135 is located at the second end 132 of the stinger 130 and is configured to connect to a coupler of a trailer. In some embodiments, the trailer hitch 135 is a pintle hook. The length of the stinger 130 causes a portion of the stinger 130 to extend beyond a rear bumper 16 of the tractor 10 when the kingpin 115 is received within the fifth wheel plate 20. In some embodiments, the stinger 130 may have a length of at least five feet. In some embodiments, the stinger 130 may have a length of at least ten feet, and preferably more than twenty feet. In some embodiments, the stinger 130 may extend beyond the rear bumper 16 of the tractor 10 by at least five feet.

Figure 8:
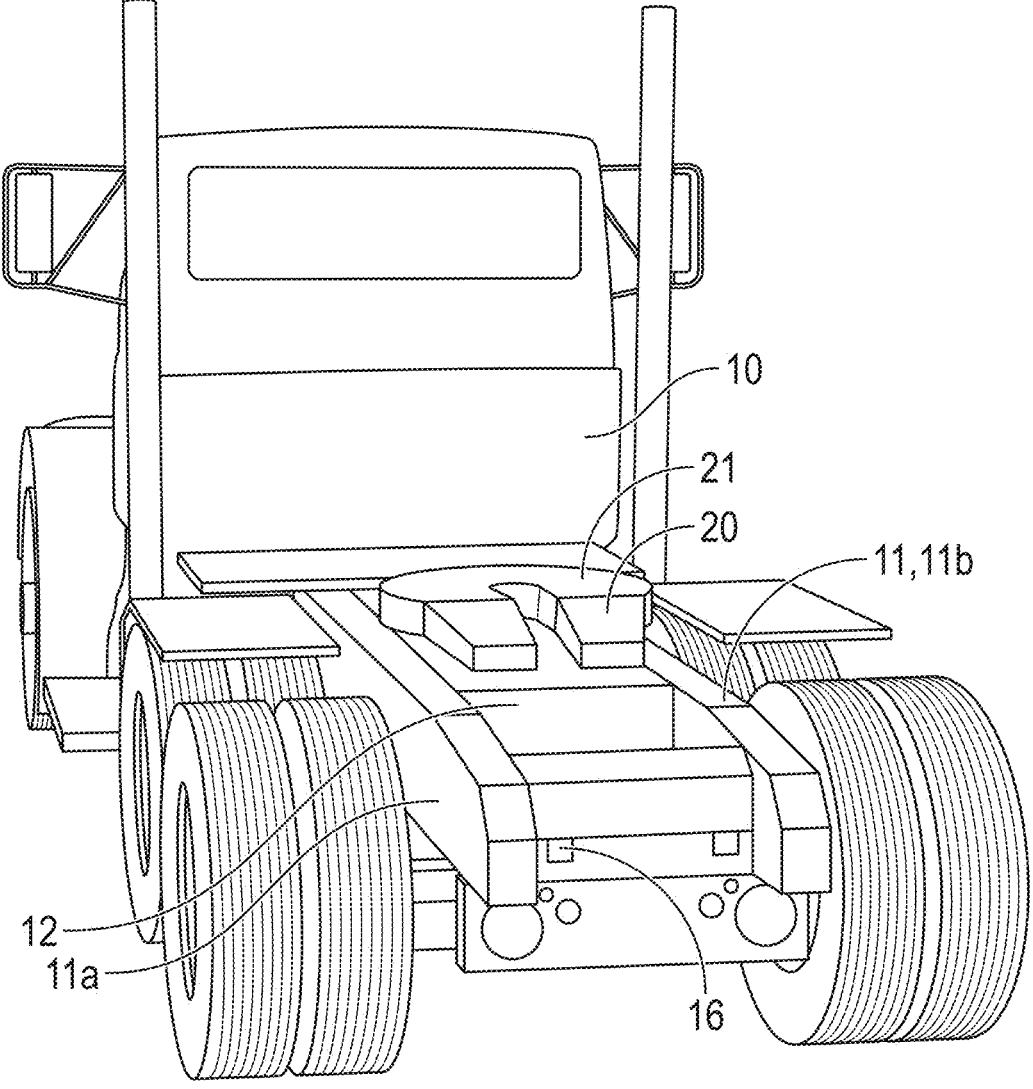
FIG. 8 illustrates a known tractor with a fifth wheel system.

During operation, the stinger 130 is simultaneously supported by the fifth wheel plate 20 and upon the frame 11 of the tractor. The stinger 130 is rigidly supported upon the frame 11 to prevent lateral movement of the stinger 130 during operation. The stinger 130 may be configured to be supported upon rails of the frame 11, which may be built to a standardized size. In some embodiments, a portion of the stinger 130 may rest upon the rear bumper 16 and/or a cross member 12 (shown in FIG. 8) of the frame 11 of the tractor 10.

The stinger 130 may include one or more stabilizers, such as a plurality of stabilizers 140 and/or a plurality of stabilizers 150 (shown in FIGS. 3 and 4), to prevent movement of the stinger 130 during operation. For example, the stabilizers 140 may each include a guard 146 positioned to interface with the frame 11, such as with an exterior side of the frame 11.

The connector 100 includes a material support 120 positioned above the first end 131 of the stinger 130. The material support 120 provides a surface upon which to load a material to be hauled by the tractor 10. As shown in FIG. 1, the material support 120 may include a front log bunk 122 to provide a U-shape to contain logs. The material support 120 is rotatably supported above the tractor 10. In some embodiments, the connector 100 includes a pivot 125 mounted upon a distribution plate 110 (best seen in FIG. 2).

As shown in FIG. 2, the kingpin 115 is inserted into the U-shaped fifth wheel plate 20 supported upon the frame 11. Above the kingpin 115 is located the distribution plate 110 that extends across a top surface 21 of the fifth wheel plate 20. The distribution plate 110 spreads the weight of the load from material support 120 upon the fifth wheel plate 20. The distribution plate 110 may be rigidly connected to the first end 131 of the stinger 130. The pivot 125 permits the material support 120 to rotate with respect to the stinger 130 and the distribution plate 110.

FIG. 3 illustrates a partial, side view and FIG. 4 illustrates a partial, plan cross-sectional view of the fifth wheel system with the connector 100. As shown in FIG. 3, the connector 100 may include the kingpin 115 that is received within the fifth wheel plate 20, the distribution plate 110 positioned above the kingpin 115 and resting upon the top surface 21 of the fifth wheel plate 20, the pivot 125 positioned above the kingpin 115 and above the distribution plate 110, and the material support 120 rigidly connected to a top portion of the pivot 125. The material support 120 extends laterally beyond frame rails 11*a*, 11*b*.

As discussed above, the connector 100 may include the first set of stabilizers 140 and/or the second set of stabilizers 150. In some embodiments, features of the first set of stabilizers 140 and the second set of stabilizers 150 may be combined. The first set of stabilizers 140 may each include an extension 145 extending laterally beyond sides 136, 137 of the stinger 130 and the guard 146 extending downward from the extension 145 below a bottom surface 134 of the stinger 130. The bottom surface 134 is opposite a top side 133. The extensions 145 may be supported upon top sides 17 of the frame rails 11*a*, 11*b*. The guards 146 may be positioned on opposing exterior sides 14 of the frame rails 11*a*, 11*b*. In other words, the width $W_E$ between the exterior sides 14 of the frame rails 11*a*, 11*b* may be the same as the distance between opposing guards 146 of the first set of stabilizers 140. Stabilizers 140 may also include a lock 141 that is actuatable to extend from the guard 146 into one of the frame rails 11*a*, 11*b*. The lock 141 may extend laterally from guard 146 in a direction towards the longitudinal axis 138 of the stinger 130.

The second set of stabilizers 150 may each include an extension 155 extending beyond the exterior sides 136, 137 of the stinger 130 and a guard 156 extending downward from the extension 155 below the bottom surface 134 of the stinger 130. Guards 156 may be positioned on opposing interior sides 13 of the frame rails 11*a*, 11*b*. In other words, the width W*I* between the interior sides 13 of the frame rails 11*a*, 11*b* may be the same as the distance between opposing guards 156 of the second set of stabilizers 150. Stabilizers 150 may also include a lock 151 that is actuatable to extend from the guard 156 into one of the frame rails 11*a*, 11*b*. The lock 151 may extend laterally from guard 156 in a direction away from the longitudinal axis 138 of the stinger 130. Stabilizers 140 and/or stabilizers 150 may also include a lock 152 that is actuatable to extend underneath the frame rails 11*a*, 11*b* of the tractor 10. The lock 152 may contact a bottom side 15 of frame rails 11*a*, 11*b*. In some embodiments, the locks 141, 151, 152 may be electronically actuatable. The locks 141, 151, 152 may be pneumatically actuatable.

The connector 100 may include a control module 160 and a fluid supply 161. The locks 141, 151, 152 of the stabilizers 140, 150 may be hydraulically actuatable by the fluid supply 161 with the control module 160 configured to selectively control flow from the fluid supply 161 to actuate the locks 141, 151, 152. In some embodiments, the fluid supply 161 may be connected to an onboard compressor of the tractor 10. In some embodiments, the locks 141, 151, 152 may be biased in their extended position with the fluid supply 161 used to retract the locks 141, 151, 152 during connection of the connector 100 to the tractor 10.

Figures 5, 6:
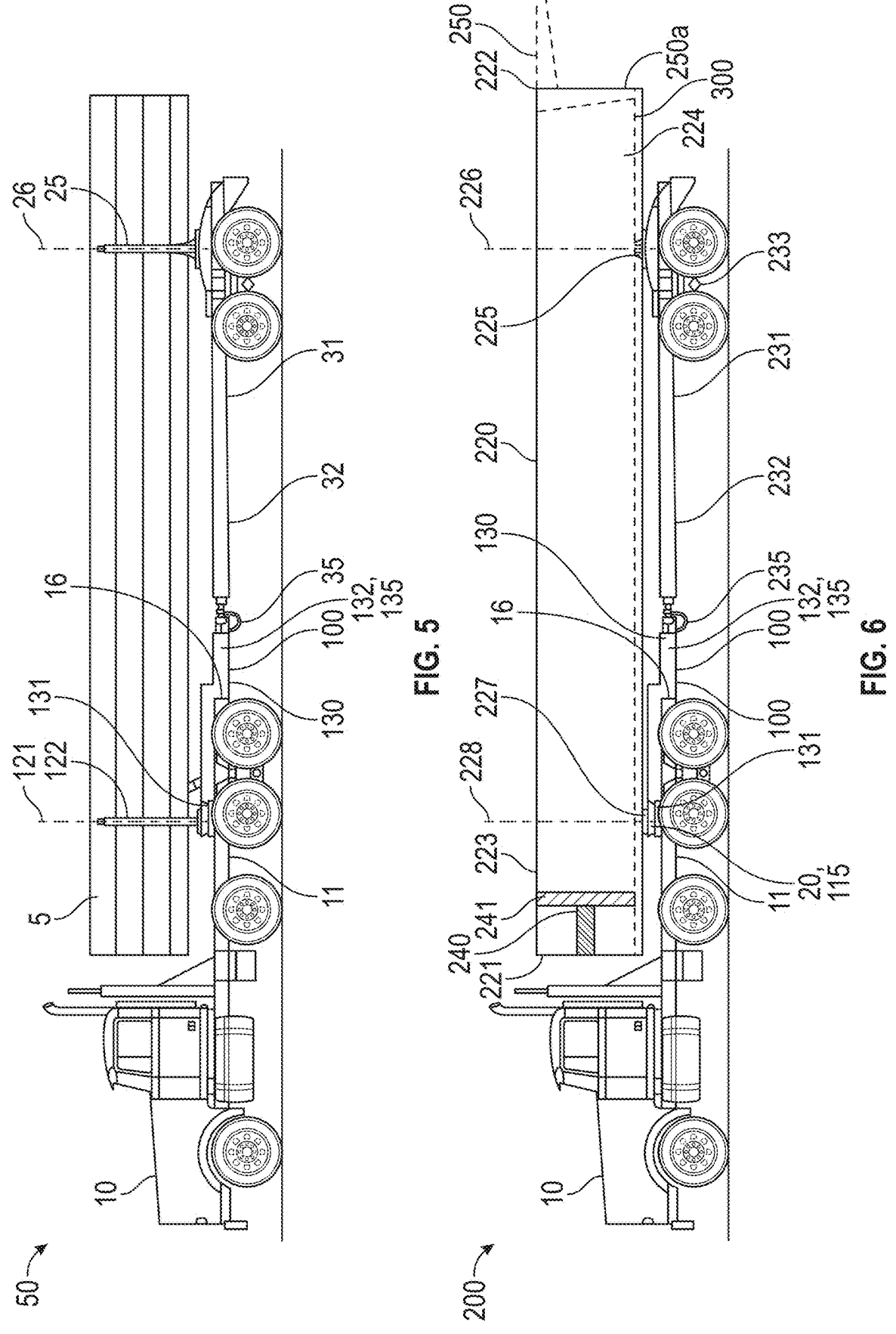
FIG. 5 illustrates a side view of a tractor-trailer including a fifth wheel connection for hauling logs, according to one embodiment of the present disclosure.
FIG. 6 illustrates a side view of a trailer for hauling materials, according to one embodiment of the present disclosure.
Figure 7:
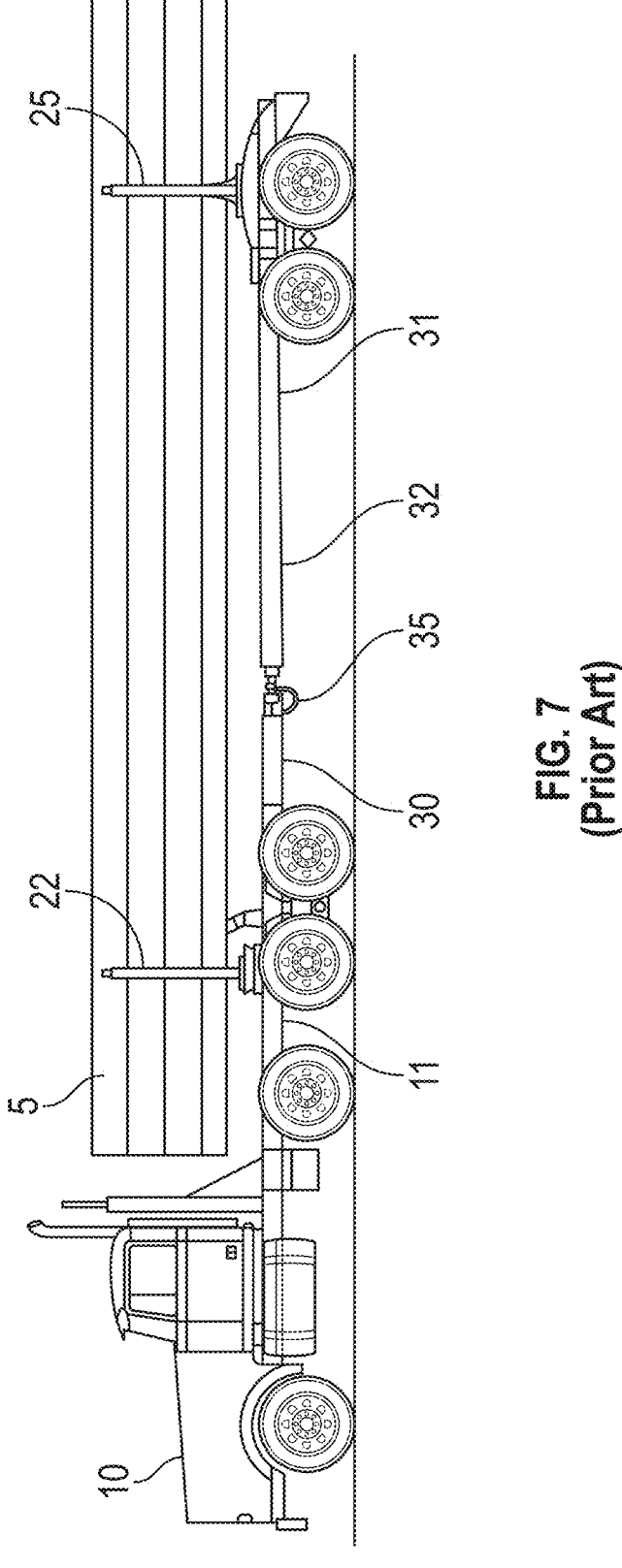
FIG. 7 illustrates a known tractor-trailer for hauling logs.

FIG. 5 illustrates an embodiment of a tractor-trailer 50 for hauling logs 5 including the fifth wheel system with the connector 100. The tractor-trailer 50 includes a tractor 10 having a fifth wheel plate 20 (shown in FIG. 1) mounted upon a frame 11 of the tractor 10. The second end 132 of the stinger 130 of the connector 100 is coupled to a trailer 31 via a coupler 35. The trailer 31 includes an extendable tongue 32 that permits the length of the tongue 32 to lengthen and shorten as the tractor 10 navigates corners while transporting the logs 5. The trailer 31 includes a rear log bunk 25 that is rotatable about a vertical axis 26. The connector 100 includes a front log bunk 122 that is rotatable about a vertical axis 121.

During use, an operator will connect the connector 100 to the tractor 10 by positioning the kingpin 115 (best shown in FIG. 3) into the fifth wheel plate 20 mounted to the frame 11 of the tractor 10. An operator may then also position the guards 146, 156 of the set of stabilizers 140, 150 adjacent to the exterior sides 13, 14 of the frame 11 of the tractor 10 and engage any locks 141, 151, 152 as described above in connection with FIGS. 3 and 4. The operator will then also couple the trailer 31 to the trailer hitch 135 at the second end 132 of the stinger 130. As a result, tractor-trailer 50 is provided with 3-points of articulation while also maintaining compatibility with a tractor 10 having a fifth wheel plate 20.

In particular, while navigating a turn, logs 5 are secured to both front log bunk 122 and rear log bunk 25. When entering a turn, the connection between the stinger 130 and trailer 31 will extend outside the radius of the turn due to the trailer hitch 135 being located behind the rear bumper 16 of the tractor 10. As a result, off-tracking of the trailer 31 will be modified and permit the trailer 31 to navigate tighter radius turns than if the trailer 31 was rotating around the point of the kingpin 115 connection. In order to prevent damages to the rigid logs spanning from front log bunk 122 to rear log bunk 25, both front log bunk 122 to rear log bunk 25 are able to rotate while navigating the curve.

If the operator desires to haul a trailer having a kingpin connection, the operator can remove the connector 100 without any need for fabrication. Likewise, when an operator desires to transition from hauling trailers having a kingpin connection to hauling logs, the operator can quickly connect the connector 100 without any need for fabrication.

FIG. 6 illustrates an embodiment of a trailer 200 for hauling materials, such as aggregate. The trailer 200 is configured to be towed by a tractor 10 having a fifth wheel plate 20 (best shown in FIG. 8) mounted upon the frame 11 of the tractor 10. The trailer 200 includes a load platform 300 extending from a front pivot 227 to a rear pivot 225. The rear pivot 225 is rotatable about a vertical axis 226. The front pivot 227 is rotatable about a vertical axis 228. The trailer 200 includes a trailer chassis 231 and a coupler 235. The trailer chassis 231 includes a trailer tongue 232 with the coupler 235 located at the end of the trailer tongue 232.

The load platform 300 spans from a first end 221 to a second end 222 and includes a front portion 223 incorporating the first end 221 and a rear portion 224 incorporating the second end 222. The front portion 223 is rotatably supported by the front pivot 227 upon the frame 11 of the tractor 10. The rear portion 224 is rotatably supported by the rear pivot 225 upon the trailer chassis 231. The trailer tongue 232 extends towards the first end 221 of the load platform 300. The trailer chassis 231 is coupled to the tractor 10 via a trailer hitch 135 of the stinger 130 that extends behind the rear bumper 16 of the tractor 10. The load platform 300 is connected to the tractor 10 via the kingpin 115 positioned beneath the front portion 223 and received within the fifth wheel plate 20 on the frame 11 of the tractor 10. The trailer chassis 231 is supported upon a trailer axle 233 and includes an extendable tongue 232 that permits the length of the tongue 232 to lengthen and shorten as the tractor 10 navigates corners. In other words, tongue 232 is not fixed in length even when the coupler 235 is connected with the trailer hitch 135. By utilizing a trailer 200 that includes both a kingpin connection and a trailer connection behind the tractor 10, rather than only one of these connection types, an operator can increase payload capacity while also increasing mobility. During operation, the load platform 300 is pulled by the connection above the kingpin 115 and the connection through the trailer hitch 135 of the stinger 130 steers the trailer axle 233 to modify the off-tracking of the trailer axle 233.

The load platform 300 may form a hopper 220. The trailer 200 may be an ejector trailer having an ejector system 240. Hopper 220 is stationary and does not tilt upward while coupled to tractor 10. The hopper 220 spans from the first end 221 to the second end 222 and includes the front portion 223 and the rear portion 224. The hopper 220 includes a gate 250 at the second end 222 of the hopper 220.

The ejector system 240 is configured to move material within the hopper 220 from the first end 221 of the hopper 220 to the second end 222 of the hopper 220. The ejector system 240 includes a plow 241 that moves through the hopper 220 to push material through the gate 250 of the hopper. As used herein, ejector system may also include a moving floor system, as are generally known in the art. The gate 250 is pivotable between an open position for offloading and a closed position 250*a* for transporting.

In some embodiments, the stinger 130 is part of a connector 100 that connects via a kingpin 115. In these embodiments, a portion of the hopper 220 forms the material support 120 of the connector 100. Another portion of the hopper 220 forms a second material support to connect the hopper 220 to the rear pivot 225. In some embodiments, the connector 100 remains connected to the trailer 200 when the trailer 200 is disconnected from the tractor 10.

In some embodiments, the stinger 130 is connected directly to the frame 11 of tractor 10. In these embodiments, kingpin 115 is mounted to an underside of the hopper 220. In some of these embodiments, the front pivot 227 may be formed by the kingpin 115 pivoting within the fifth wheel plate 20.

Although an embodiment has been illustrated in relation to an ejector trailer with a hopper, this disclosure includes other types of high clearance trailers where the load is positioned entirely above the trailer axles. A first material support holds the load above the kingpin connection and a second material support holds the load above the trailer axle. As shown in FIG. 5, the first material support and second material support may be log bunks. In other embodiments, the first material support and second material support may be formed into a load platform extending along the trailer. For example, some embodiments include trailers having a load platform extending from above the kingpin to above the trailer chassis and trailer axles, such as the trailer 200 shown in FIG. 6. The load platform rotates both above the kingpin and above the trailer chassis. However, trailers other than ejector trailers can also benefit from this disclosure, such as flat bed trailers, van trailers, tank trailers, and belt trailers. For example, rather than the load platform forming a hopper, the load platform may form a flat bed, a tank, or a van box.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

I claim:

1. A fifth wheel connection system comprising:
   a connector including a stinger having a length extending from a first end to a second end, a kingpin at the first end, a trailer hitch at the second end, and a first material support positioned above the kingpin and rotatable with respect to the stinger about a first vertical axis of rotation, the kingpin configured to be received within a fifth wheel plate of a tractor; and
   a trailer having a tongue and a chassis supported upon a trailer axle, a coupler at an end of the tongue configured to be received by the trailer hitch, and a second material support positioned above the chassis and rotatable with respect to the chassis about a second vertical axis of rotation.

2. The fifth wheel connection system of claim 1, wherein the first material support is a first log bunk and the second material support is a second log bunk.

3. The fifth wheel connection system of claim 1, wherein the trailer includes a load platform extending from the first material support to the second material support.

4. The fifth wheel connection system of claim 3, wherein the trailer is an ejector trailer and the load platform forms a hopper, the hopper having a first end, a second end, and an ejector system configured to move material within the hopper from the first end of the hopper to the second end of the hopper.

5. The fifth wheel connection system of claim 1, further comprising a set of stabilizers connected to the stinger configured to engage with a frame of the tractor, the set of stabilizers configured to prevent lateral movement of the stinger with respect to the frame of the tractor.

6. The fifth wheel connection system of claim 5, wherein each stabilizer of the set of stabilizers has a guard, the guards of the set of stabilizers are positioned on opposing exterior sides of the stinger to engage with the frame of the tractor.

7. The fifth wheel connection system of claim 5, wherein each stabilizer of the set of stabilizers has a guard positioned on a side of the stinger, at least one stabilizer of the set of stabilizers includes a lock selectively extendable from the guard.

8. The fifth wheel connection system of claim 7, wherein the lock is configured to extend into the frame of the tractor.

9. The fifth wheel connection system of claim 7, wherein the lock is configured to extend underneath the frame of the tractor.

10. A connector for a fifth wheel system of a tractor-trailer, the connector comprising:
    a stinger having a length extending from a first end to a second end;
    a kingpin at the first end;
    a material support positioned above the kingpin, the material support rotatable with respect to the stinger, the material support rotatable about a vertical axis of rotation; and
    a trailer hitch at the second end.

11. The connector of claim 10, wherein the trailer hitch is a pintle hook.

12. The connector of claim 10, wherein the length of the stinger is at least five feet.

13. The connector of claim 10, wherein the material support is a first log bunk.

14. The connector of claim 10, wherein the material support is connected to a front portion of a hopper, the hopper having a first end, a second end, the front portion, a rear portion, and a gate at the second end of the hopper.

15. The connector of claim 10, further comprising a set of stabilizers connected to the stinger, each stabilizer of the set of stabilizers having a guard shaped to interface with a frame of a tractor to prevent lateral movement of the stinger with respect to the frame of the tractor.

16. The connector of claim 15, wherein a distance between the guards of the set of stabilizers is an exterior frame width of a tractor.

17. The connector of claim 15, wherein at least one stabilizer of the set of stabilizers includes a lock selectively extendable from the guard.

18. The connector of claim 17, further comprising a control module and a fluid supply, wherein the lock is actuatable by the fluid supply, the control module configured to selectively control flow from the fluid supply to actuate the lock.

19. A fifth wheel trailer comprising:
a load platform having a first end, a second end, a front portion, and a rear portion, the load platform extending from the first end to the second end;
a trailer chassis having a tongue and a coupler at an end of the tongue configured to be received by a trailer hitch, the trailer chassis supported upon a trailer axle, the rear portion of the load platform rotatably supported upon the trailer chassis about a vertical axis of rotation; and
a kingpin positioned beneath the front portion of the load platform.

20. The fifth wheel trailer of claim 19, wherein the load platform is a hopper, the hopper including a gate at the second end.

21. The fifth wheel trailer of claim 19, further comprising a stinger having a length extending from a first end to a second end, wherein the kingpin is at the first end of the stinger and the trailer hitch is at the second end of the stinger, the front portion of the load platform rotatably supported above the kingpin and rotatable with respect to the kingpin about another vertical axis of rotation.

* * * * *